United States Patent [19]
Kishida et al.

[11] 4,027,095
[45] May 31, 1977

[54] HERMETICALLY SEALED ARC FURNACE

[75] Inventors: Hideaki Kishida, Tokyo; Hiroshi Fukuoka, Tokuyama; Teruhiko Kameyama, Shinnanyo, all of Japan

[73] Assignees: Nisshin Steel Co., Ltd.; Matsuzaka Company, both of Tokyo, Japan

[22] Filed: Feb. 13, 1975

[21] Appl. No.: 549,477

[30] Foreign Application Priority Data

Feb. 21, 1974 Japan ............................ 49-20701
Dec. 12, 1974 Japan ............................ 49-142000
Dec. 12, 1974 Japan ............................ 49-142001

[52] U.S. Cl. .................................. 13/9 R; 13/14
[51] Int. Cl.² ................................. H05B 7/00
[58] Field of Search ............ 75/11, 130.5, 49, 133; 13/9, 10, 14–17, 31, 35

[56] References Cited
UNITED STATES PATENTS

| | | | |
|---|---|---|---|
| 2,243,096 | 5/1941 | Hardin | 13/17 |
| 3,194,634 | 7/1965 | Yelnik et al. | 13/9 |
| 3,502,461 | 3/1970 | Güttler | 75/11 |
| 3,615,348 | 10/1971 | Tanczyn | 75/11 |
| 3,635,699 | 1/1972 | Chadwick | 75/130.5 |
| 3,711,278 | 1/1973 | Josefsson | 75/130.5 |

*Primary Examiner*—R. N. Envall, Jr.
*Attorney, Agent, or Firm*—Silverman & Cass, Ltd.

[57] ABSTRACT

A hermetically sealed arc furnace for producing stainless steel is disclosed which makes use, as a main raw material, a semi-reduced chrome ore pellet and a reduced iron ore pellet and by which these pellets are melted, decarburized and finally refined under a reduced pressure said hermetically sealed arc furnace capable of adjusting its interior reduced pressure, and particularly including a vacuum-tight seal between the furnace lid and furnace body, a telescopically sealed gap between the lid and an electrode extending therethrough and an exhaust opening detachably connected to a vacuum pump for reducing the internal pressure within the furnace.

2 Claims, 11 Drawing Figures

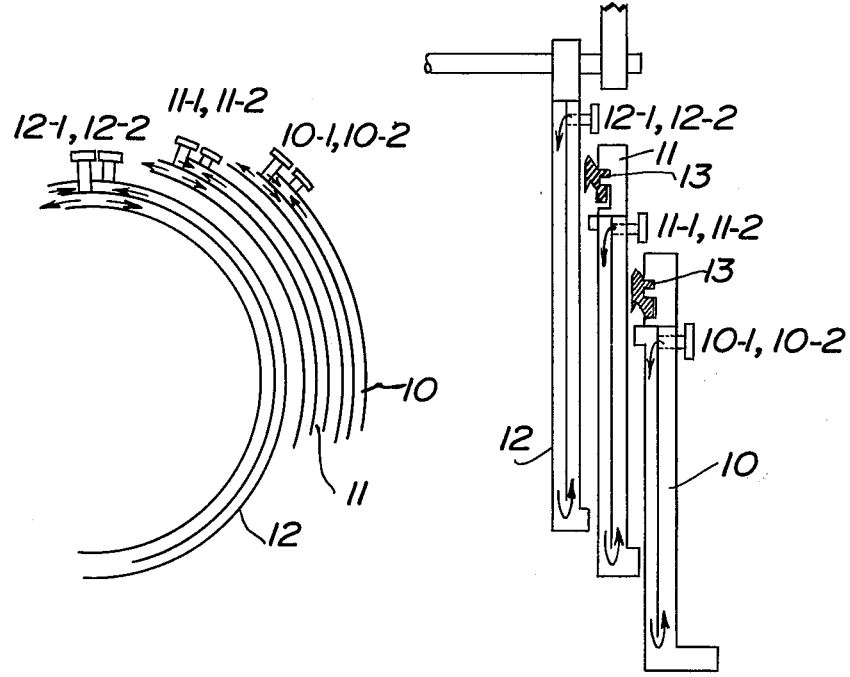

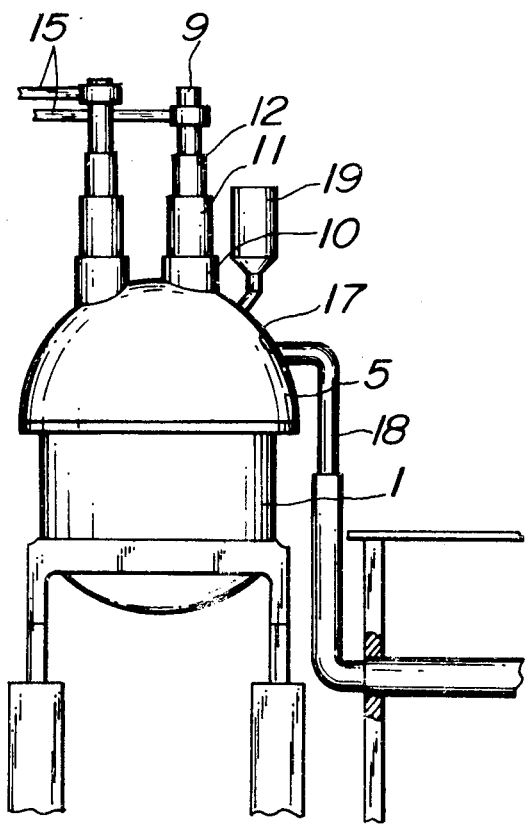
FIG_7

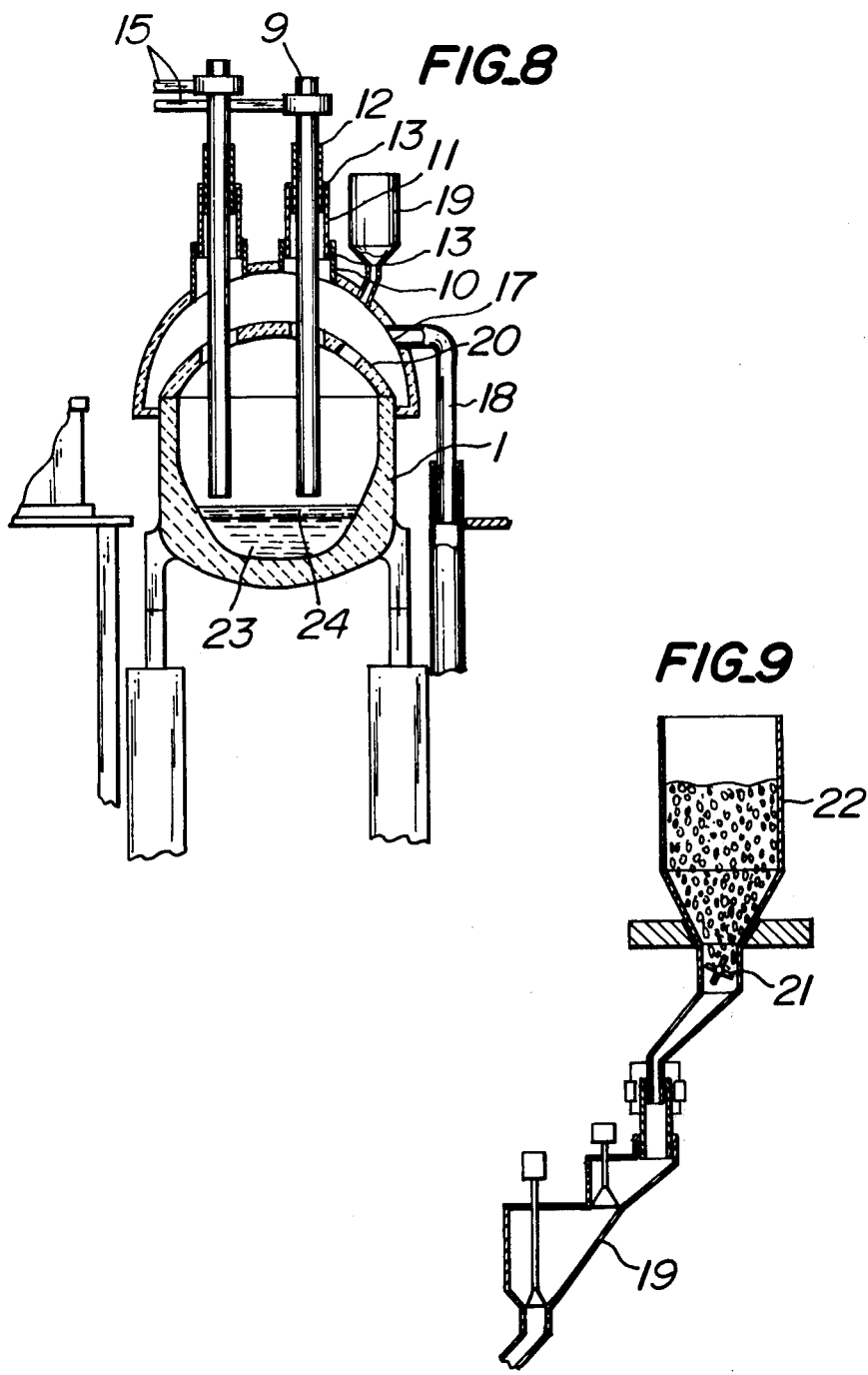

HERMETICALLY SEALED ARC FURNACE

This invention relates to an arc furnace for producing stainless steel under a reduced pessure.

In order to appreciate the advantages and use of the arc furnace provided by the invention some understanding of prior art methods of producing stainless steel should be considered.

A. A most general method which comprises a first step of charging and melting a stainless steel scrap or steel scrap together with a ferroalloy such as ferrochrome, ferromangenses, etc. in an electric furnace under atmospheric pressure, a second step of decarburizing molten metal containing 1.0% to 1.5% by weight of carbon by introducing oxygen under atmospheric pressure to a degree on the order of 0.04% to 0.08% by weight of carbon, a third step of reducing metal oxides of chrome, manganese, iron, etc. produced by said decarburization by means of a reducing agent such as ferrosilicon, etc. and recovering chrome thus obtained and a final step of refining by menas of a new slug formed by lime, flurospar, etc., all of the above four steps being effected in the same electric furnace.

B. A method in which the arc furnace is used only for the purpose of melting the raw material. The molten bath obtained from the arc furnace is charged into a converter where the molten metal is partly decarburized to an extent such that chrome in the molten metal is not oxidized and then the partly decarburized molten metal is completely decarubized under vacuum and finally refined to produce stainless steel.

C. A method which is the same the method B until the molten bath is obtained. In the present method the molten bath is charged into a converter into which a mixed gas composed of oxygen gas and other gases in blown through tuyeres provided at the furnace bottom to reduce partial pressure of Co and effect decarburization while suppressing oxidation of chrome. The metal oxide produce by the decarbuization is reduced by means of a reducing agent such as ferrosilicon, etc. and then refined and finally tapped into a ladle to produce stainless steel.

D. A method which is the same as the above mentioned process B after the molten bath has been charged into the coverter. In the present method, use is made of a combustion type furnace such as a shaft furnace instead of the melting furnace used in the process B. A chrome ore, iron ore as raw materials and coke as a reducing agent are used to produce chrome containing pig iron with higher carbon content which is then treated by a combination of the shaft furnace and the converter or a combination of the shaft furnace, the converter and degasification to produce stainless steel.

In each of the above mentioned prior art methods, the ferroalloy used as the raw material of producing the stainless steel is preferably of low-carbon ferroalloy for the purpose of significantly reduce carbon in the stainless steel. The low-carbon ferroalloy is produced from ores through complex steps and hence is expensive, thereby making the production cost of the stainless steel expensive.

One the contrary, if use is made of ferroalloy which is less expensive, all of these ferroalloys contain much amount of carbon which results in presence of carbon in an amount which is in excess of the carbon content required for the stainless steel. In order to reduce the carbon content in the molten metal, all of the methods of producing stainless steel must be subjected to decarburization in which oxygen gas is blown into the molten bath. This oxygen gas blowing step causes loss of metal components due to their oxidation and requires many enormous equipments, complex steps, difficult operations and large expenditure.

In addition, a high-carbon ferrochrome which is the main raw material for the stainless steel and which is less expensive relative to low-carbon ferrochrome must be charged together with a chrome ore subjected to various pretreatments, a reducing agent and a flux into an electric furnace where a dry reduction refining is effected. As a result, the high-carbon ferrochrome becomes expensive and covers the most of the cost of producing the stainless steel.

The steel scrap used as one of the main raw materials for the stainless steel is generally expensive and considerably changeable in its marketing price which results in a significant change in the cost of producing the stainless steel.

Prior art arc furnaces heretofore proposed are designed to effect melting and refining under atmospheric pressure and hence are not hermetically sealed. As a result, such type arc furnace when used for production of steel caused various difficulties. That is, a dust collector provided for the sake of preventing public pollution is required to have a dust collecting capacity which can suck in an amount of gas which several times to several tens times larger than the amount of gas produced in the furnace since the furnace sucks a much amount of air from the outside of the furnace thereinto. However, irrespective of the provision of the large capacity dust collector a portion of the dust produced in the furnace is always escaped through gaps of the furnace into the outside of contaminate the outside air, thereby necessitating installation of dust collector built into a room.

In addition, a large amount of outside cold air is sucked through gaps of the furnace thereinto where it is heated and then exhausted therefrom. As a result, latent heat of such exhaust gas causes a corresponding heat loss, thereby lowering a thermal efficiency of the arc furnace. Moreover, in the prior art arc furnace, the arc produced between the electrodes and the raw material and melting the latter causes a large noise of more than 100 phones, thereby degrading the operating condition and living environment. In addition, convection and radiation of heat produced from the molten bath are effected through furnace gaps and nitrogen in the air heated by arc under atmospheric pressure becomes nitrogen oxide NOx, thereby arising a problem of pollution the atmospheric air.

In addition, in the prior art arc furnace, it is inevitable to avoid consumption of graphite electrode surface due to oxidation. This electrode consumption makes the cost of electrodes and hence the cost of production high.

As described hereinbefore, the use of the prior art arc furnace has various disadvantages.

In recent years, scraps supply tends to be short all over the world. In addition, conditions of locating steel production mill are limited in space, investment cost becomes enormous and measures must be taken how to eliminate the public pollution. In order to satisfy these conditions, a direct reduction method has been developed and noticed by those skilled in the art. As a result, a miniature mill on the basis of a combination of an ore pretreating equipment started from Midlex method, shaft furnace, electric furnace and continuous casting method has been taken into consideration.

The direct reduction method which makes use of the shaft furnace has the following advantages.

1. The pretreatment on the basis of a ore dressing method using a high magnetic force ore dressing machine is capable of treating a public pollution generating product such as sulfur, phosphorus, etc. without burning it by oxidation.
2. The thermal energy has a thermal efficiency which is comparable to that of the shaft furnace or will have a thermal efficiency which is higher than that of the shaft furnace in future by improvement of technics such as heat exchange, etc. As a result, heat energy can be economized.
3. This direct reduction method makes use of a closed gas cyclic system, and as a result, if a high temperature gas furnace is developed, this direct reduction method is liable to be combined with an atomic power iron producing method. Thus, clean energy can effectively by utilized without requiring raw material coal and petroleum which are scarce over all wide the world.
4. One unit has a yield of from 500,000 tons/year to 1,000,000 tons/year and is liable to be combined with an open hearth furnace and electric furnace. In addition, this method can be applied in production scale usual in the special steel field.

But, in order to effect a solid reduction without completely reducing the molten bath, it is desirous to solve the following four problems.

1. A further reduction reaction must be advanced in th case of melting by the refining furnace.
2. Re-oxidation of sponge iron having a high activity must be prevented.
3. In the case of continuous melting, arc must be stabilized.
4. A load electric power must be increased in the case of arc melting. These problems, which have been encountered with the direct reduction method are different from those inherent to the method of producing steel and the arc furnace for carrying out the method of production.

An object of the invention is to provide a hermetically sealed arc furnace for producing stainless steel which is capable of melting, decarbuizing and refining semi-reduced chrome pellet and reduced iron pellet under a reduced pressure and which is capable of adjusting its interior reduced pressure and having a ratio of an inner diameter to inside depth of 0.5 to 2.0, said furnace comprising a vacuum-tight sealing means arranged between a furnace lid and a furnace body, means for telescopically sealing a gap formed between a furnace lid and an electrode extending therethrough and an exhaust opening detachably connected to a pressure reducing means.

The invention will now be described in greater detail with reference to the accompanying drawings, wherein:

FIG. 5A is an elevational diagrammatic representation of the three double walled sleeves shown in FIG. 5 and illustrating the electrode seal in greater detail.

FIG. 5B is a horizontal section illustrating the cooling water inlet and outlet pipes shown in FIG. 5.

FIG. 7 is a front elevation of another embodiment of the hermetially sealed arc furnace according to the invention;

FIG. 8 is a partial vertical sectional view of the furnace shown in FIG. 7; and

FIG. 9 is a sectional view of the hermetically sealed hopper connected to the raw material tank.

Figure 1:
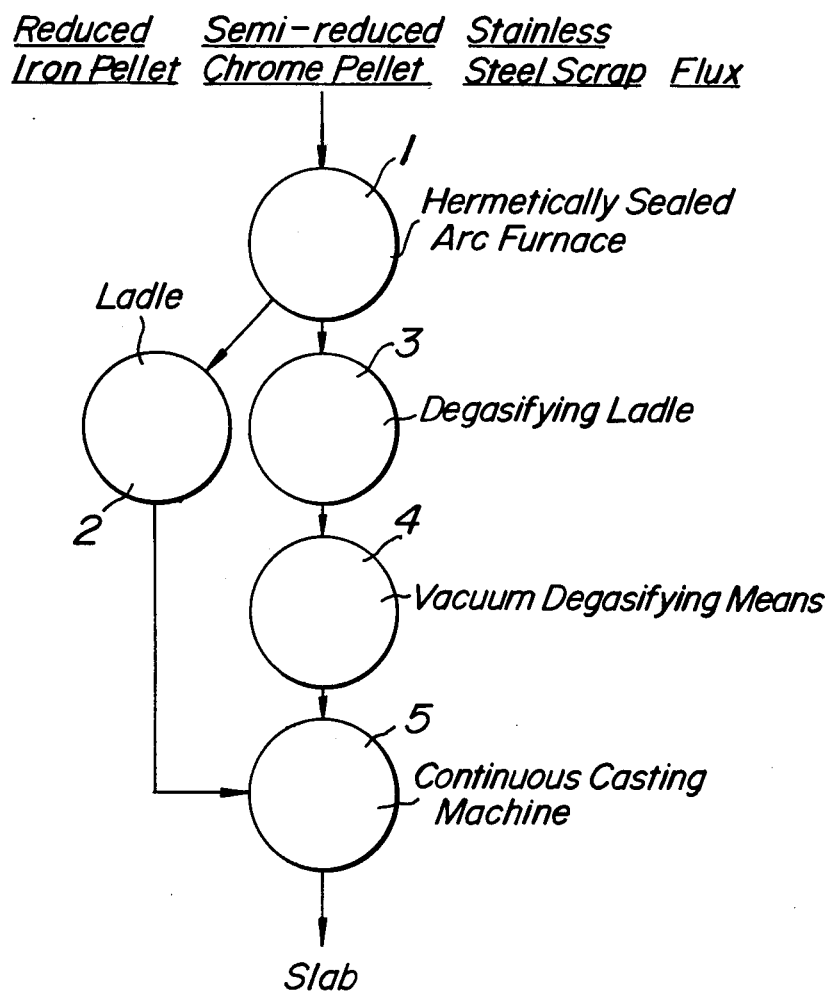
FIG. 1 is a flow sheet diagram for illustrating the steps of the method capable of being carried out by the invention.

The arc furnace according to the invention is capable of producing stainless steel in accord with the method, the steps of which are illustrated in FIG. 1 and reference will be made thereto for describing such method so that the arc furnace according to the invention is better understood. FIG. 1 which illustrates the steps thereof.

The arc furnace according to the invention can be used with two processes, the first being where the furnace is charged with a raw material consisting of a reduced iron pellet, semi-reduced chrome pellet, stainless steel scrap and flux are charged 1 where the raw material is melted and refined. The refined molten metal is tapped into a ladle 2. In due time, the molten metal is poured from the ladel 2 into a continuous casting machine 5 where the molten metal is cast into a slab.

In the other process, after the raw material has been melted or half-refined in the arc surface, it is tapped into a degasifying ladle 3 which is disposed in a vacuum degasifying means 4. The degasified metal is poured into the continuous casting machine 5 where the molten metal is cast into a slab.

The semi-reduced chrome pellet and reduced iron pellet used as the chrome and iron supply sources, respectively, are produced by well known techniques, respectively.

These pellets together with the other necessary stainless steel raw material, for example, stainless steel scrap and flux such as calcium oxide are charged into a hermetically sealed arc furnace provided with three electrodes where the raw material is melted under a reduced pressure and is also decarburized. In the first process A, both the melting and the decarburization of the raw material are effected in the arc furnace only, the metal oxide in the charged raw material, that is, the non-reduced ingredient in the reduced pellet, for example, $Cr_2O_3$ and $FeO$ which serve as a oxygen supply source for supplying oxygen in the case of decarburization of the metal oxide must be balanced with the overall amount of carbon contained in the charged raw material. If the amount of the metal oxide contained in the charged raw material and serving as the oxygen supply source is not sufficient to effect the decarburization, it is possible to introduce oxygen gas into the arc furnace so as to effect the decarburization. The melting of the raw material in the arc furnace is effected in the same manner as the usual melting of the raw material under atmospheric pressure. In this case, a high arc voltage used to melt the raw material causes a glow discharge. In order to avoid such glow discharge, it is necessary to maintain the vacuum degree on the order 5 to 250 mmHg.

As described above, after the raw material has been melted, decarburized and refined in the hermetically sealed arc furnace 1, the molten metal is tapped into the ladle 2. In due time, the molten metal is poured from the ladle 2 into the continuous casting machine 5 where it is cast into slabs.

Use is made of raw materials which are just the same as those used in the process A. Overall amount of carbon in the raw material is made more or less larger than that in the raw material used in said first mentioned process. The raw material is charged into a hermetically sealed arc furnace provided with three electrodes where the raw material is melted in the same manner as before. As soon as the raw material is melted, the metal oxide in the raw material reacts with carbon in the raw material to start decarburization. Contrary first process, the decarburization is not effected to an extent that the carbon content reaches to the final carbon value aimed at.

That is, the decarburization is stopped when the carbon value reaches to a value which will be decarburized in a vacuum degasifying device 4. Such molten metal without subjected to refining is tapped from the furnace 1 into a degasifying ladle 3.

The degasifying ladle 3 is placed in the vacuum degasifying means 4 where the molten metal is subjected to a final decarburization and refining under a high vacuum degree, preferably lower than 50 mmHg. After the molten metal has finally been descarburized and refined in the vacuum degasifying means 4, it is adjusted in composition and temperature and then poured into the continuous casting machine 5 where it is cast into slabs.

The hermetially sealed arc furnace according to the invention will now be described The furnace shell is similar to that of the usual electric furnace and adapted to be tilted by means of a rack-pinion mechanism, trunnion and other tilting means.

In the case of continuously melting the reduced iron pellet, etc., the furnace body may by made stationary or rotatable in the same manner as the arc reducing furnace. The molten metal may be continuously tapped out through a tapping hole such as a sliding gate provided at the lower part of the furnace body. Alternatively, the molten metal may be tapped out through a tapping hole provided at that part of the furnace body which is located below the molten bath level.

The stationary furnace body may be suspended in the same manner as the ladle refining system and served also as a casting ladle. The furnace body may be closed with a semi-sphere shaped furnace lid. The furance lid is provided at its upper surface with three holes through which three electrodes are extended and an opening through which main and auxiliary raw materials are charged into the furnace body under a reduced pressure and which can be hermitically sealed from the outside air.

The furnace lid is provided with a gas exhaust opening detachably connected to a pressure reducing means such as a vacuum pump or an ejector which can suck in the gas in the furnace to reduce the pressure therein. In addition, the provision may be made of a measuring hole through which a sample is drawn up from the molten bath during refining, through which the temperature of the molten bath is measured and though which argon gas, for example, is introduced into the furnace.

In accordance with the invention, provision is made of means for hermetically sealing the interior of the furnace from the outside thereof and located at a junction between the detachable furnace lid and the furnace body, located at contact between raising up and lowering down electrodes and the furnace lid, and located at the contact between the furnace lid and the exhaust duct.

The means for hermetically sealing the junction between the furnace lid and the furnace body is composed of opposed annular grooves formed on water cooled metal boxes and an annular packing made of a synthetic rubber and snugly fitted in the annular grooves. When the furnace lid is disposed on the furnace body, the annular packing serves to interrupt the outside air. Alternatively, the steel sheet may be embedded into fluid product such as fluid sand and the like and water head and differential pressure due to vacuum may be utilized to hermetically seal the junction between the furnace lid and the furance body.

Those parts of the furnace lid which are extended through the exhuast duct and the electrodes may be hermetically sealed by means of a lip packing made of teflon. This telfon packing is sandwiched through water cooled metal sleeves between the furnace lid and the exhuast duct on the one hand and between the furnace lid and the electrodes.

In the present invention, it is preferably to provide an inner lid made of refractory material in the lower side of the furnace lid. Provision may be made of a space between the upper side surface of the inner lid and the lower side surface of the furnace lid so as to prevent gas produced during the operation from being passed a shortest distance and flow into the exhaust duct. For this purpose, the inner lid may be provided with several holes through which the gas product during the operation is introduced into the space and then the gas is sucked into the exhaust duct.

The inner lid is further provided with three holes through which three electrodes are extended through, respectively. A gap formed between the inner lid and the electrode is made as small as possible so as to prevent deterioration of a telescopic sealing means provided between the furnace lid and the electrodes. In addition, the inner lid may be connected through a chain, etc. to the furnace lid in order to detachably mount the inner lid together with the furnace lid on the furnace body.

The operation of the arc furnace according to the invention will now be described. In the first place, the furnace lid together with the inner lid and the electrodes are removed from the upper part of the furnace body. Then, the raw materials such as steel scrap, ferroalloy, etc, are charged into the furnace body and subsequently the furnace lid is disposed on the furnace body so as to suspend the electrodes extending through the furnace lid. Then, the pressure reducing means is driven to reduce the pressure in the furnace and an electric power is supplied to the electrodes when the interior of the furnace is evacuated to a given vacuum degree. After the raw materials have completely been melted, the electric power supply is stopped, if necessary, and a oxygen supply lance is inserted from the furnace top part into the furnace to effect the oxygen blow refining. Subsequently, a suitable flux such as lime, fluorspar, etc. is charged into the furnace and the electric power is supplied again. After the refining has been completed, the tapping hole closed beforehand by clay, etc, is made open by an oxygen lance or a bar. Then, the furnace body is tilted to top the molten bath into a ladle. In due time, the molten metal is poured from the ladle into a mould where it is cast into slabs. The molten metal may be poured from the ladle into a continuous casting machine where it is casted into slabs.

The vacuum degree suitable for the operation effected by the arc furnace according to the invention is required to be limited to a range where no glow discharge occurs during supply of the electric power to the electrodes.

Figure 6:
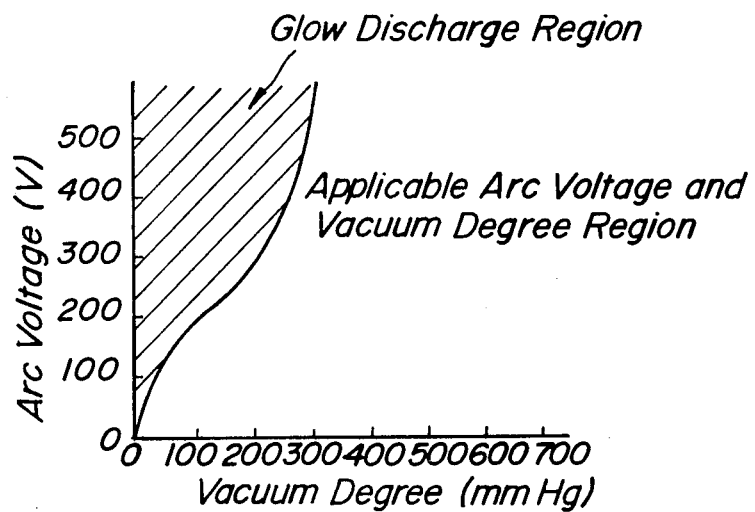
FIG. 6 is a graph which illustrates the mutual relation between the arc voltage and the vacuum degree that may be utilized in the practice of the present invention.

In FIG. 6 is shown the mutual relation between the vacuum degree and the arc voltage. The glow discharge region is shown by shaded lines. If the arc voltage 250 V is used in the case of melting the raw material scrap, it is necessary to make the vacuum degree higher than 150 mmHg. If the arc voltage 200 V is used in the case of refining the molten bath, it is necessary to make the vacuum degree higher than 100 mmHg. On the contrary, in the beginning of melting reduced iron pellet raw material, etc. which is difficult to make electrically conductive, it is necessary to make the vacuum degree which is located near the glow discharge region shown by shaded lines in FIG. 6 for the purpose of improving the arc discharging effect.

In the case of melting the usual raw material, it is possible to supply the electric power under a reduced pressure of 300 to 500 mmHg in order to decrease the production of nitrogen oxide NOx. The use of such measure provides the important advantage that the nitrogen oxide can be reduced, and that the noise can simultaneously be prevented.

Figure 2:
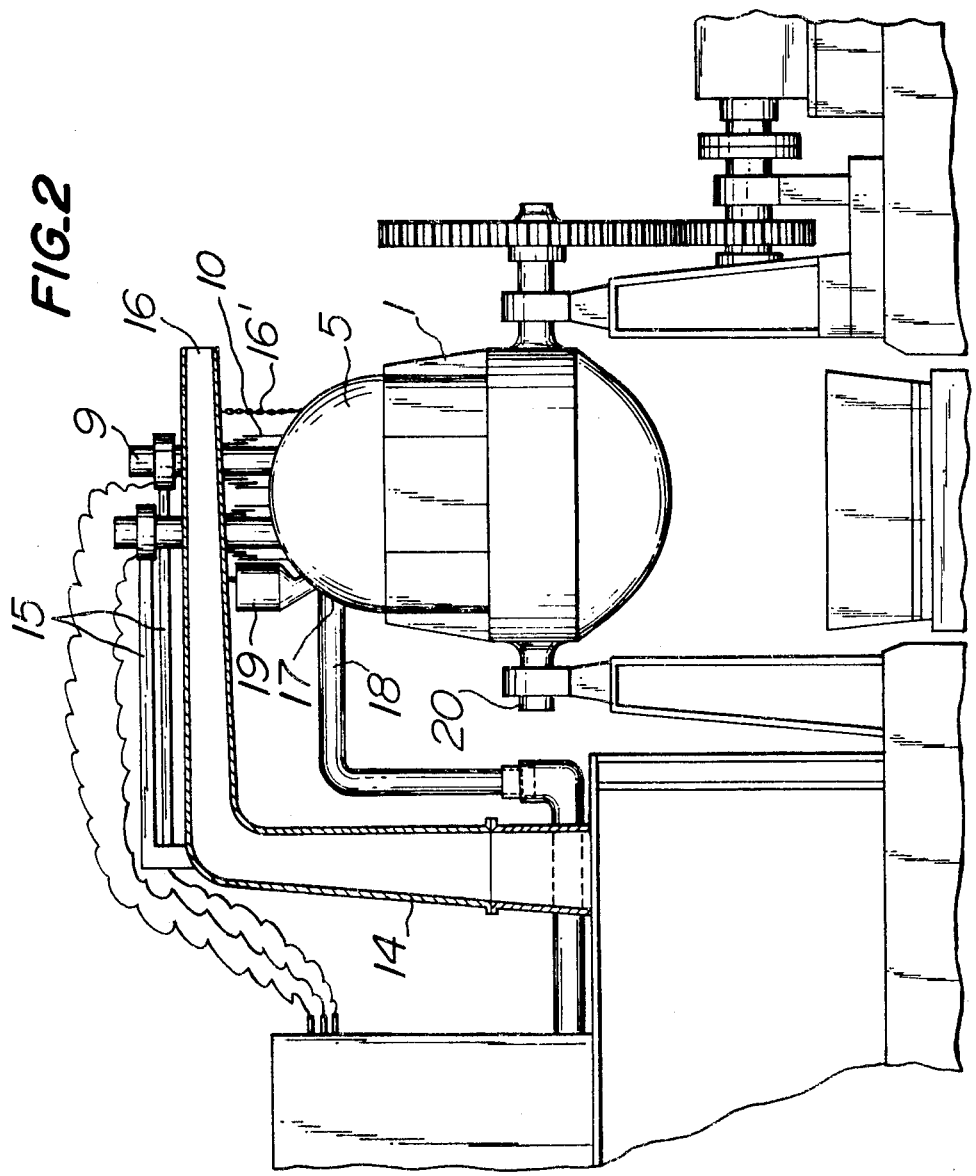
FIG. 2 is a front elevation of one embodiment of the hermetically sealed arc furnace according to the invention.
Figure 3:
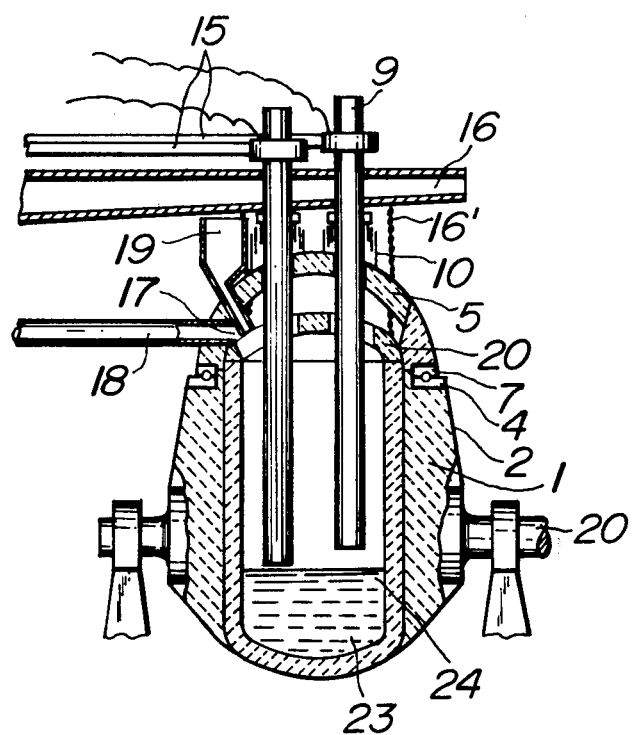
FIG. 3 is a partial vertial sectional view of the furnace shown in FIG. 2.
Figure 4:
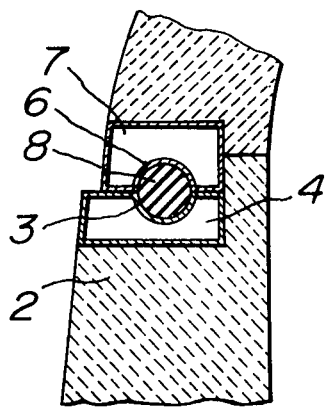
FIG. 4 is an enlarged fragmentary cross-sectional view taken through a junction between the furnace body and the furnace lid.

In FIGS. 2 and 3 is shown one embodiment of a hermetically sealed arc furnace which is preferably used for carrying out the method according to the invention. The furnace shown in FIGS. 2 and 3 is of a pear-shaped furnace having a ratio of its inside diameter to its height from the inner top wall of a furnace body 1 to the inner bottom refractory wall, that is, to the furnace inside depth of 0.5 to 2.0. The furnace body 1 is provided at its inside with a lining of refractory material. The innermost layer of the refractory lining is made of a basic refractory material, such as magnesia. The furnace shell 2 made of a thick steel sheet is provided at is uppermost portion with a downwardly faced groove 3 which is semi-circular in section and surrounded by a water cooling box 4.

The open top of the furnace body 1 is closed by a semi-sphere shaped furnace lid 5. The furnace lid 5 is composed of an outer shell made of a steel sheet lined with a refractory material. That portion of the furnace lid 5 which abuts against the top of the furnace body 1 is provided with an upwardly faced groove 6 which is semi-circular in section and surrounded by a water cooling box 7. The upwardly faced groove 6 is opposed to the downwardly faced groove 3 to form a hollow annular groove in which in snugly fitted an annular synthetic rubber packing 8 having a high heat resistant property, thereby hermetically seal the atmosphere in the furnace from the exterior air.

As a system for interrupting the interior of the furnace from the exterior air, use may be made of a well known sand seal mechanism which is made $\rho gh > 760$ mmHg ($\rho$ is specific gravity, $g$ is gravitational constant and $h$ is a head) with the aid of extremely fine grain sand which becomes hermetically sealed condition when subjected to a differential pressure due to vacuum or multi-layered non-volatile liquid or quasi-fluid such as fluid sand, etc., thereby obtaining a water head $h$ higher than vacuum differential pressure and sealing the interior of the furnace from the exterior air. In such system, each partition chamber is held under a defined vacuum differential pressure by closing a conduit under a difined vacuum degree by means of a pressure switch.

Figure 5:
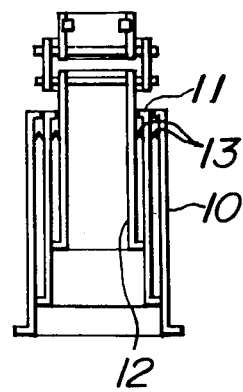
FIG. 5 is a front elevation of a telescope type sealing means provided for that part of the furnace lid through which the electrodes are extended.

The furnace lid 5 is provided at that part through which are extended electrodes 9 with a telescope type hermetically sealing means. The telescope type hermetically sealing means is composed of an outer water-cooled double walled sleeve 10 made of stainless steel and secured to the furnace lid 5, an inner water-cooled double walled sleeve 12 made of stainless steel and secured to the electrode 9 and an intermediate water-cooled double walled sleeve 11 made of stainless steel and slidably sandwiched between the outer and inner sleeves 10 and 12 as shown in FIGS. 3, 5 and 5B. At least one lip-shaped packing 13 made of Teflon is sandwiched between the outer and intermediate sleeves 10 and 11 on the one hand and between the intermediate and inner sleeves 11 and 12 on the other hand (see FIG, 5A). As a result, during operation of the furnace, when the electrode 9 is raised up and lowered down, the inner sleeve 12 secured to the elctrode 9 can slidably move along the intermediate sleeve 11 which is also slidably movable along the outer sleeve 10 secured to the furnace lid 5. That is, the hermetically sealing means composed of the outer, intermediate and inner sleeves 10, 11 and 12 ensures a telescopic slidable movement and provides a telescope type hermetially sealing means which can reliably seal the gap formed between the furnace lid 5 and the electrode 9 without disturbing the raising up and lowering down movement of the electrode 9.

In the embodiment shown in FIGS. 2 and 3, provision is made of a supporting column 14 which not only can be raised up and lowered down but also can be swung aside. To the supporting column 14 are secured brackets 15 which can hold the upper parts of the electrodes 9, respectively. The supporting column 14 is provided at its upper end with a horizontally extending frame 16 which is connected through chains 16' to the furnace lid 5. As a result, if the supporting column 14 is raised up and lowered down, as well as swung aside, the brackets 15 and the frame 16 and hence the electrodes 9 and the furnace lid 5 become simultaneously raised up and lowered down and swung aside.

Alternatively, the brackets 15 and the frame 16 may be raised up and lowered down and swung aside independently from each other.

The furnace lid 5 is provided at its one side with an exhaust opening 17 which is connected to a water cooled exhaust duct 18. Gas produced in the furnace is exhausted through the exhaust opening 17 and water cooled exhaust duct 18 to the outside.

The furnace lid 5 is provided with a raw material supply tank 19 adapted to charge the ferroalloy or flux little by little into the furnace. The ferroalloy or flux is charged through holes provided for an inner lid 20 into the molten bath.

The raw material supply tank 19 may be connected through a rotary valve 21, etc. to a stationary hopper 22 hermetically sealed by an inert gas such as nitrogen and the like as shown in FIG. 9 for the purpose of continuously charging a much amount of raw material which is liable to be easily oxidized such as reduced iron pellet. The raw material supply tank 19 may be secured to th furnace lid 5 by means of a double bell structure and the like.

The refined metal 23 together with the slag 24 shown in FIG. 8 are tapped into a suitable ladle after the electric power supply has been stopped, the reduced pressure has been released to the atmospheric pressure, and the furnace has been tilted by means of a well known furnace body tilting means.

The reasons why the ratio of the furnace inner diameter to the furnace inside depth is limited to 0.5 to 2.0 are as follows. If this ratio is smaller than 0.5, the furnace becomes too high and the electrode becomes weak in strength during the melting period. On the contrary, if this ratio is larger than 2.0, the furnace capacity for receiving the reduced metal pellet becomes small and there is a risk of the molten metal being splashed and adhered upon the furnace lid.

In the embodiment shown in FIGS. 2 and 3, the furnace body 1 is tiltably journalled by a trunnion 20.

In another embodiment shown in FIGS. 7 and 8, the furnace body 1 is made stationary. In such furnace, the furnace base may be provided with a tapping hole. In addition, furnace body 1 may be of a ladle type which may be The arc furnace according to the invention of the following dimensions was utilized to carry out a method of producing stainless steel which is described hereafter.

Nominal amount to be melted 150 Kg
Capacity of transformer 250 KVA
Inner diameter of furnace 950 mm
Diameter of electrode 76 mm

EXAMPLE 1

Use was made of reduced iron pellet and semi-reduced chrome pellet obtained by technics known per se as iron and chrome supplying sources, respectively. In the present example, both the redued iron pellet and the semi-redued chrome pellet were used in their cold state, but it is preferable to use these pellets in their hot state for the sake of saving heat energy.

Compositions of the reduced iron pellet and the semi-reduced chrome pellet are listed in the following Tables 1 and 2.

Table 1

| | | | | Reduced iron pellet | | | | | | |
|---|---|---|---|---|---|---|---|---|---|---|
| C | P | S | Fe | FeO | $SiO_2$ | $Al_2O_3$ | CaO | MgO | Rest | Total Fe |
| 0.20 | 0.030 | 0.010 | 89.00 | 6.0 | 2.8 | 1.5 | 0.10 | 0.05 | 0.30 | 93.7 |

Table 2

| | | | | Semi-reduced chrome pellet | | | | | | |
|---|---|---|---|---|---|---|---|---|---|---|
| C | P | S | Cr | $Cr_2O_3$ | Fe | FeO | $SiO_2$ | $Al_2O_3$ | CaO | MgO | Rest |
| 3.5 | 0.010 | 0.120 | 25.00 | 11.70 | 19.00 | 1.30 | 6.0 | 16.0 | 0.50 | 12.0 | 4.87 |

1. Composition of raw material:

Use was made of special steel scrap called as SUS 430 scrap by the Japanese Industrial Standard as well as the reduced iron pellet and the semi-reduce chrome pellet in ratios shown in the followings Table 3.

Table 3

| | Amount of charge (Kg) | Amount of metal (Kg) |
|---|---|---|
| SUS 430 scrap | 30 | 30 |
| Reduced iron pellet | 102 | 96 |
| Semi-reduced chrome pellet | 74 | 39 |
| Total | 206 | 176 |

2. Operation

The raw material having the above mentioned composition was charged from the top of the hermetically sealed arc furnace thereinto. After the raw material has been charged, the furnace lid was closed to hermetically seal the furnace body.

Then, electric power was supplied to the furnace and a vacuum pump was started to reduce the pressure in the hermetically sealed furnace. If the interior of the arc furnace is excessively exhausted, a glow discharge occurs as shown by shaded lines in FIG. 6, and as a result, the vacuum degree was made on the order to 250 mmHg in order to avoid the glow discharge. The electric power was adjusted such that a secondary voltage of the transmformer was made 150 V and a secondary current was made on the order of 1,000 A.

The electric power was supplied for about 5 minutes until the vacuum degree reached to 250 mmHg. Subsequently, the vacuum pump was adjusted so as to make the vacuum degree on the order from 230 mmHg to 280 mmHg. After the electric power has been supplied for 120 minutes, it became about 380 KWH where it was stopped. Then the vacuum was released to measure the temperature of the molten metal and effected sampling thereof.

The results of the temperture measurement and sampling are as follows.

Table 4

| Temperature 1,550° C Chemical composition | | | | | |
|---|---|---|---|---|---|
| C | Si | Mn | P | S | Cr |
| 0.08 | — | — | 0.026 | 0.012 | 16.61 |

According to the analytical result, 1.2 Kg of ferrosilicon, 0.3 Kg of low carbon ferromanganese and 6 Kg of low carbon ferrochrome were added as a ferroalloy and 3 Kg of CaO and 1 Kg of $CaF_2$ were added as a flux. After the ferroalloy and the flux have been added, the arc furnace was hermetically sealed again and the electric power was supplied to the furnace which was then kept under a reduced pressure. Th electric power was adjusted so as to make the secondary voltage 130 V and the secondary current 1,050 A. The interior of the furnace was exhausted to the vacuum degree which was the same as that of the melting step.

The refining was effected for 35 minutes and then the electric power was stopped and the reduce pressure was released The temperature of the molten metal was 1,630° C.

The molten metal thus obtained was tapped from the furnace into a ladle from which the molten steel was poured into a mold.

The chemical composition, the amount of non-metal inclusion and the like were comparable with those obtained by other steel manufacturing methods.

As seen from the above practial example, the hermetially sealed arc furnace according to the invention is capable of using cheap semi-reduce chrome pellet as a chrome supply source and cheap reduced iron pellet as an iron supply source, effecting decarburization and refining under a reduced pressure, and preventing production of dust, arc noise and nitrogen oxide NOx as well as preventing surface oxidation of the electrodes. In addition, the use of a single hermetially sealed furnace under a reduced pressure for the purpose of effecting both the melting step and the refining step ensures a significantly high thermal efficiency and provides the important advantages which are far superior to those of the prior art melting furnace and refining furace, which read as follows:

1. The use of large amount of semi-reduce chrome pellet and reduced iron pellet makes the raw materrial cost extremely less expensive.
2. The manufacturing steps from ores to slabs are simplified and the installation cost becomes cheap.
3. Substantially no decarburization is effected by oxygen gas so that chrome is not substantially oxidized, and as a result, it is not necessary to recover chrome with the aid of reducing agent such as ferrosilicon and the like, thereby decreasing damage of the refractory material.
4. The use of a hermetically sealed furnace ensures
   i. omission of a dust collector,
   ii. no suction of cold atmosphere into the furnace and hence improvement of its thermal efficiency,
   iii. occurrence of small noise,
   iv. elimination of production of a nitrogen oxide, and
   v. less consumption of electrodes due to oxidation.

The arc furnace according to the invention will now be described with reference to the following example 2.

EXAMPLE 2

Nominal amount to be melted: 150 Kg
Transformer capacity: 250 KVA
Furnace body outer diameter: 1,250 mm$\phi$
Furnace body inner diameter: 1,050 mm$\phi$
Furnace body outer depth: 1,450 mm
Furnace body inner depth: 1,050 mm
Electrode diameter: 76 mm$\phi$ The electrode used was made of graphite and three electrodes were arranged along a pitch circle if 550 mm$\phi$. The furnace was used for carrying out the following steps.

1.
High carbon ferrochrome: 42.0 Kg
Steel scrap: 90.0 Kg
SUS 430 scrap: 31.0 Kg were charged into the furnace body and the furnace lid was disposed on the furnace body. The pressure in the furnace body was reduce to 200 mmHg and then electric power (150 V, 1,000 A) was supplied to the electrodes to melt the raw material for 80 minutes.

2. 13.5 Kg of iron ore was added little by little from the raw material supply tank provided for the furnace lid. As a result, the carbon in the molten bath was decreased from 1.8% to 0.05% and the chrome in the molten bath was decreased from 17.5% to 16.5%

3. Then, 1.0 Kg of lime and 0.4 Kg of fluorspar were added little by little from the raw material supply tank provided for the furnace lid. The refining was effected for 15 minutes. As a result, the sulfur was decreased from 0.025% which had been present before the addition of the lime to 0.008%. The oxygen contained in the steel before the tapping from the furnace was 60 ppm.

4. The electric power supply was stopped and the reduced pressure was restored to the atmospheric pressure. Then, the tapping hole which had been closed was made open and the furnace was tilted to tap the molten bath into a ladle from which it was poured into a mould.

5. The chemical composition of the ingot, the content of non-metallic inclusion as well as the oxygen value were superior to those of the ingot obtained by other steel manufacturing methods.

As stated hereinbefore, the arc furnace according to the invention is capable of using cheap high carbon raw material, effecting a sufficient decarburization under a reduced pressure, preventing generation of dust, arc noise and nitrogen oxide. There is no risk of the electrode surface from being oxidized. In addition, the use of a single arc furnace under vacuum renders it possible to make the installation cost less expensive, improve the thermal efficiency, and signifiantly decrease the metal loss. The arc furnace according to the invention provides the following various advantages.

1. The arc furnace is hermetically sealed so that operational and living environments can be improved owing to the following reasons.
   1. Generation of dust and dirt can be prevented, and as a result, the use of a dust collector becomes unnecessary.
   2. It is possible to prevent noise from being produced.
   3. nitrogen oxide NOx is not produced.
   4. The thermal operation can be effected with ease.
2. The arc furnace is hermetically sealed and operated under a reduced pressure so that the overall cost becomes less expensive owing to the following reasons.
   1. The electrodes are less consumable due to oxidation.
   2. The decarburization can easily be effected so that it is possible to use cheap raw material such as high carbon raw material, reduced pellet and the like.
   3. The use of a single furnace for effecting melting, decarburization and refining ensures improvement in thermal efficiency, least metal loss and low installation cost.
   4. Product obtained is superior in quality.
   5. The arc furnace according to the invention is capable of effecting melting in a carbon monoxide reducing atmosphere under a reduced pressure so that combustion due to oxidation is not produced, a rapid arc heating can be effected under a high load condition and it is possible to improve yield of the furnace. On the contrary, the prior arc furnace has been subjected to a rapid combustion due to oxidation in the case of continuously melting the reduced pellet by means of the arc heat.

What is claimed is:

1. A hermetically sealed arc furnace comprising
   A. a furnace body having a ratio of an inner diameter to an inside depth of 0.5 to 2.0;
   B. a furnace lid provided with a gas exhaust opening;
   C. a pressure reducing means detachably connected to said gas exhaust opening;
   D. an electrode extending through said furnace lid into said furnace body;
   E. a hermetically sealing means arranged between said furnace lid and said furnace body and composed of a pair of semicircular cross-section grooves into which a gasket material is inserted, said gasket bearing total weight of said furnace lid; and
   F. a telescope-type sealing means arranged between said furnace lid and said electrode and composed of an outer water-cooled double-walled sleeve secured to said furnace lid, an inner water-cooled double-walled sleeve secured to said electrode, and an intermediate water-cooled double-walled slidably sandwiched through a Teflon packing between said outer and inner sleeves.

2. A hermetically sealed arc furnace as claimed in claim 1, wherein said hermetically sealing means is composed of semicircular grooves formed on abutted ends of said furnace lid and furnace body to form a hollow annular groove and each surrounded by a water cooling box and said gasket material being annular formed of synthetic rubber snugly fitted within said grooves.

* * * * *